Aug. 22, 1961     HANS-PETER MENTE     2,996,958
METHOD AND APPARATUS FOR HOBBING TOOTHED ELEMENTS
Filed June 20, 1956                4 Sheets-Sheet 1
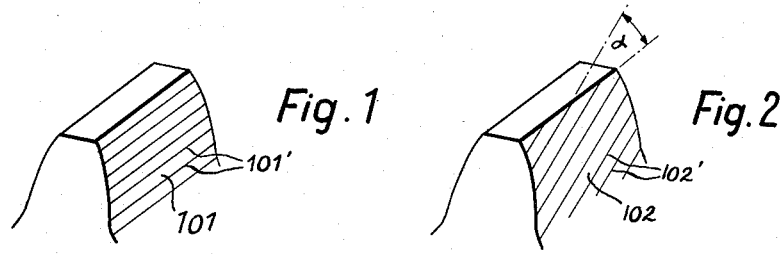
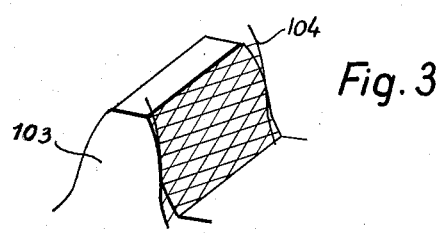
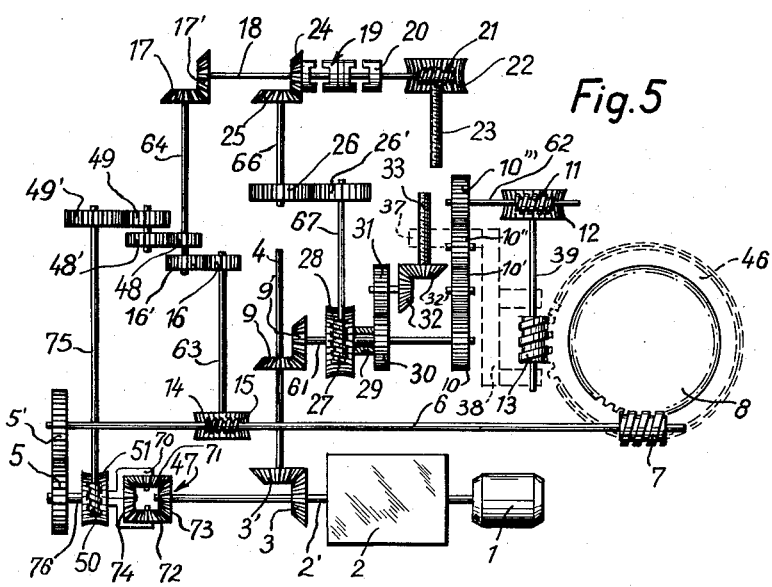
INVENTOR
HANS-PETER MENTE
BY *Dicke and Craig*
ATTORNEYS

INVENTOR
HANS-PETER MENTE

BY
ATTORNEYS

2,996,958
METHOD AND APPARATUS FOR HOBBING TOOTHED ELEMENTS

Hans-Peter Mente, Ludwigsburg, Germany, assignor to Fa. Hermann Pfauter, Ludwigsburg, Germany
Filed June 20, 1956, Ser. No. 592,608
Claims priority, application Germany June 21, 1955
3 Claims. (Cl. 90—4)

The present invention relates to a novel method and apparatus for the manufacture of toothed elements, such as gears or the like, by the gear hobbing method.

The present invention relates further to an arrangement for carrying out the gear hobbing method in accordance with the present invention and consists in that the tangential displacement or feed of the cutter or hob is coupled with the axial displacement or feed thereof. In one embodiment of such an arrangement the amount of axial displacement or feed of the cutter or hob tangentially to the workpiece and the speed of such displacement or feed are adjustable.

In the course of the gear hobbing operation the gear teeth are formed in the workpiece by contour cuts of the cutting teeth of the helical cutter or hob, the individual teeth of which follow one another in the gear hobbing operation. These envelope or contour cuts, as is well known, especially in connection with gears having a relatively smaller number of teeth, must be arranged symmetrically on both pressure surfaces of one tooth which is ordinarily sought to be attained by means of special feeler gauges for purposes of adjustment of a tooth or a tooth gap of the cutter or hob in the center of the machine. Moreover, the wear of that tooth of the cutter or hob is decisive for the tool life of the hob which during the cutting of the gear tooth gap has to take off the largest chip or shaving with the heaviest cut.

Accordingly, it is an object of the present invention to provide a novel and improved method and apparatus for hobbing gears.

A further object of the present invention resides in the provision of a gear hobbing machine which produces gears in which the envelope or contour cuts of the gears proceed along a diagonal over the pressure surface of the gear.

Still another object of the present invention is the provision of a novel and improved gear hobbing method and apparatus for carrying out the method by means of which the gears have greatly improved roll-off characteristics and more particularly in which the teeth of the gears are so formed that during rolling off between meshing teeth a wedging or hooking engagement along the pressure surfaces of the respective gears and any roll-off jumps and noises produced thereby are positively avoided.

Another important feature and object of the present invention is the provision of such a gear hobbing method and apparatus which will enable even wear of the teeth of the cutter or hob.

It has already been proposed in the prior art to extend the tool life of the cutter or hob by displacing the cutter or hob, after completing the cutting or hobbing operation of one workpiece and before commencement of the hobbing operation of the next workpiece, by an amount in the direction of the axis thereof, i.e., tangentially to the workpiece, which corresponds to the distance of the axial displacement of two adjoining teeth which follow one another in the hobbing operation. In that manner, in connection with different workpieces which are to be machined in a similar manner, different teeth of the cutter or hob are brought into cutting operation little by little at that point at which a cutting tooth of the hob is subjected to the greatest load so that the cutting teeth of the hob eventually are being worn evenly.

Instead of displacing the hob after the exchange of each workpiece in a step-like manner, as described above, it has also been already proposed to displace the hob in a continuous manner already during the cutting or hobbing operation by a fractional amount of the distance of the displacement of two teeth which lie one behind the other in the direction of the hob axis, i.e., tangentially to the workpiece. However, by the use of such a hobbing method, the hob is displaced over the entire length thereof only after machining a relatively large number of workpieces. If, however, only a relatively small number of workpieces is to be machined, then the purpose sought to be achieved by such a displacement of the hob tangentially to the workpiece, namely the even use and wear of the entire hob, will not be attained.

The present invention, in contradistinction thereto, consists in that the cutter or hob during machining or cutting of a single workpiece, i.e., during the displacement thereof in the axial direction of the workpiece over the width of the workpiece, is displaced or moved once over the entire length thereof in a continuous manner in the direction of the hob axis tangentially to the workpiece while the workpiece is additionally rotated corresponding to this tangential displacement.

Such a method and corresponding apparatus exhibits, among others, the important advantage that the hob, quite independently of the number of workpieces to be machined, is always worn evenly as each tooth of the hob, even when machining or cutting only a single workpiece, is already brought into cutting position, even at that place at which the largest chip or shaving is to be taken off the workpiece, i.e., where the heaviest cut is to take place.

A further important advantage of the method and apparatus in accordance with the present invention is to be seen in that the polygonal edges of the contour cuts forming the tooth faces or pressure surfaces do not extend in parallel to the lines of intersection between the external peripheral surfaces and the pressure surfaces of the teeth but instead extend diagonally over the faces or pressure surfaces of the teeth, i.e., at an angle to these lines of intersection, and thereby produce in the direction of projection of these lines of intersection, not a polygon, but an evolvent or involute. This obviates the necessity to adjust a tooth of the gear hob to the center of the machine in order to produce symmetrical gear teeth in the workpiece or blank. The gear teeth rather exhibit symmetrical contours of the teeth faces or surfaces regardless of the number of teeth in the gear.

A further object of the present invention and advantage derived by the present invention resides in that the toothed gears manufactured in accordance with the method and machine of the present invention exhibit rolling-off characteristics which are considerably superior to those of the prior art, in particular are such that the teeth of meshing gears roll off one another during meshing engagement much more quietly than gears manufactured in accordance with the prior art.

A still further object of the present invention is to provide a method and means for hobbing gears which assures even wear of the hob teeth regardless of the number of workpieces to be made and of the number of teeth on each gear.

A still further object of the present invention is the provision of a gear hobbing machine which permits the manufacture of an unlimited number of gears which are all identical with respect to one another, and more particularly, which are all identical with respect to each other as regards the location of a tooth gap with respect to a particular point on the gear such as a spline groove in the gear hub.

Another object of the present invention is the provision of a method and apparatus for hobbing gears which produces symmetrically arranged surfaces of the teeth without the use of any special equipment or special skill by the operator.

These and further features, objects and advantages of the present invention will become more obvious from the following description when taken in connection with the accompanying drawing which shows, for purposes of illustration only, several embodiments in accordance with the present invention, and wherein:

FIGURE 1 is a partial perspective view showing the contour cuts of a gear tooth made in accordance with the methods and machines of the prior art.

FIGURE 2 is a partial perspective view similar to FIGURE 1 showing the contour cuts of a gear tooth made in accordance with the method and machine of the present invention.

FIGURE 3 is a partial perspective view similar to FIGURE 2 indicating the improved roll-off characteristic of two meshing gears provided with teeth made by contour cuts in accordance with the present invention.

FIGURE 5 is a schematic showing of the drive arrangement of the gear hobbing machine of FIGURE 4 in accordance with the present invention.

Figure 4:
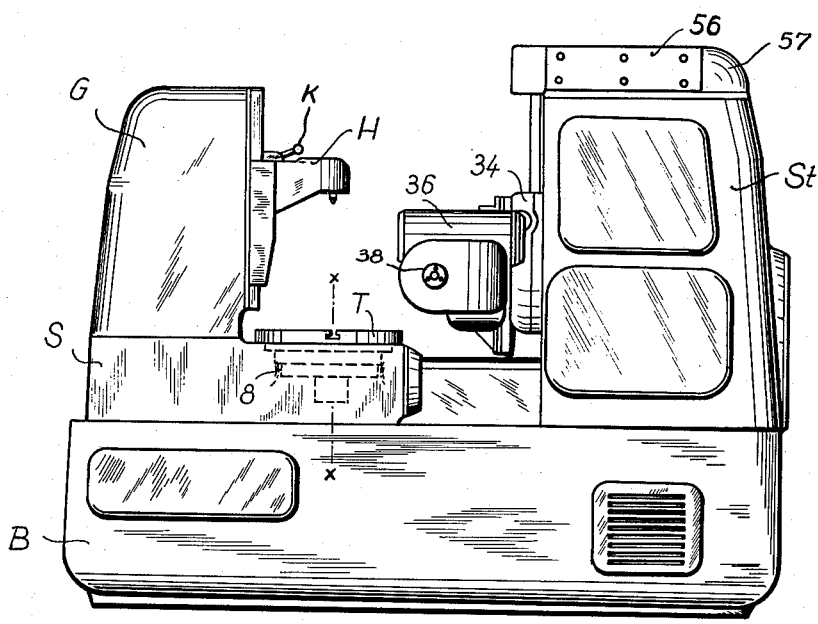
FIGURE 4 is a frontal view of a gear hobbing machine in accordance with the present invention.

FIGURES 1 to 3 serve as explanation and illustration of the reason why the teeth of a gear made in accordance with the gear hobbing method and machine of the present invention exhibit better roll-off characteristics.

Referring now more particularly to the drawing wherein like reference numerals are used to designate like parts, FIGURE 1 illustrates a tooth of a gear made in accordance with the prior art. In such prior art gear hobbing operations every tooth of the cutter or hob always carries out during one working operation or pass the same contour cut for the tooth gap. The edges 101′ of these contour cuts and other traces of this machining operation which take on the form of more or less deep grooves or channels 101 along the faces or pressure surfaces of the teeth, extend parallel to the direction of the tooth. If the pressure surfaces of two teeth roll off one another, as occurs during meshing engagement of such gears, then the edges 101′ of the contour cuts of the surfaces of the two gear teeth, which are pressed against each other, interlock or hook into each other which increases the friction. As a result thereof the raised portions or edges 101′ between the grooves 101 of the cuts come to lie upon each other whereby roll-off jumps are produced and objectionable noises are created during the further rolling off of the teeth.

FIGURE 2 shows a tooth made in accordance with the method and machine of the present invention. The tooth of the cutter or hob which corresponds, for example, to the edge 102′ of the contour cut, machines at one end of the workpiece at first the base of the tooth. Moreover, as simultaneously with the axial movement in the longitudinal direction of the tooth gap the cutter or hob is displaced tangentially to the workpiece while the workpiece is additionally rotated corresponding to such tangential displacement the point of application or contact of the particular tooth of the cutter or hob with the workpiece moves upwardly along the face or surface of the tooth with increasing axial movement. The edge 102′ of the contour cut 102 represents the course of the inter-action of this cutter or hob tooth. Thus, the edges 102′ of the contour cuts 102 thereby proceed at an incline to the outer base lines of the tooth surfaces of the workpiece, i.e., form an angle α with the generatrix or line of intersection of the outer peripheral and pressure surfaces of the tooth.

FIGURE 3 shows the interaction of the edges of the contour cuts of two teeth 103 and 104 which roll off with respect to each other, the teeth having been made in accordance with the method of the present invention according to which the cuts extend diagonally over the tooth surfaces. The edges of the contour cuts which are pressed against one another are disposed angularly with respect to each other. Consequently, they are unable to hook into one another, nor can any roll-off jumps take place which would produce objectionable noises as is the case in connection with gear teeth made in accordance with the prior art gear hobbing methods and machines.

In one practical embodiment for the realization of the gear hobbing operation according to the present invention the direction of the axial movement over the width of the workpiece is so chosen that the teeth of the cutter or hob proceed along the workpiece from a zone of finish cutting to a zone of preliminary or initial cutting.

In a further embodiment according to the present invention the cutter or hob after termination of the tangential displacement and/or of the axial displacement thereof is returned at a rapid traverse to the initial or starting position thereof.

The overall appearance of a gear hobbing machine according to the present invention is illustrated in FIGURE 4 and consists, as usual, of a base or bed B and of an upright stand or support St. The carriage S is slidably guided on the base B in the horizontal direction parallel to the plane of the drawing of FIGURE 4. The carriage S carries the work table T which is rotatable about a vertical axis x—x and the counter support or upright standard G which is provided with the supporting arm H. The cutter or hob carriage 34 with the cutter or hob head 36 are adjustable in the vertical direction along the stand St in any well known manner. The supporting arm H may be adjusted in the vertical direction and may be clamped in any desired position by any suitable well known device, such as clamp K.

The drive arrangement of the gear hobbing machine in accordance with the present invention is schematically illustrated in FIGURE 5. The driving motor 1 drives a change-speed gear 2, the output shaft 2′ of which in turn drives a pair of bevel gears 3 and 3′, the bevel gear 3 being suitably secured to shaft 2′ and the bevel gear 3′ being suitably secured or splined to the vertical shaft 4 which is thereby driven by the bevel gears 3 and 3′.

Drive of the workpiece table

The output shaft 2′ of the change speed gear 2 also drives a change gear 5 over differential 47 and shaft 76 to be discussed more fully hereinafter. The gear 5 meshes with another gear 5′ to provide an appropriate gearing ratio which in turn drives a shaft 6. The worm 7 is secured to the right end of shaft 6 as viewed in FIGURE 5 and in turn drives the worm gear 8, the gear 8 being secured to the table T for the workpieces or blanks of the gear hobbing machine.

Drive of the cutter or hob

Figure 7:
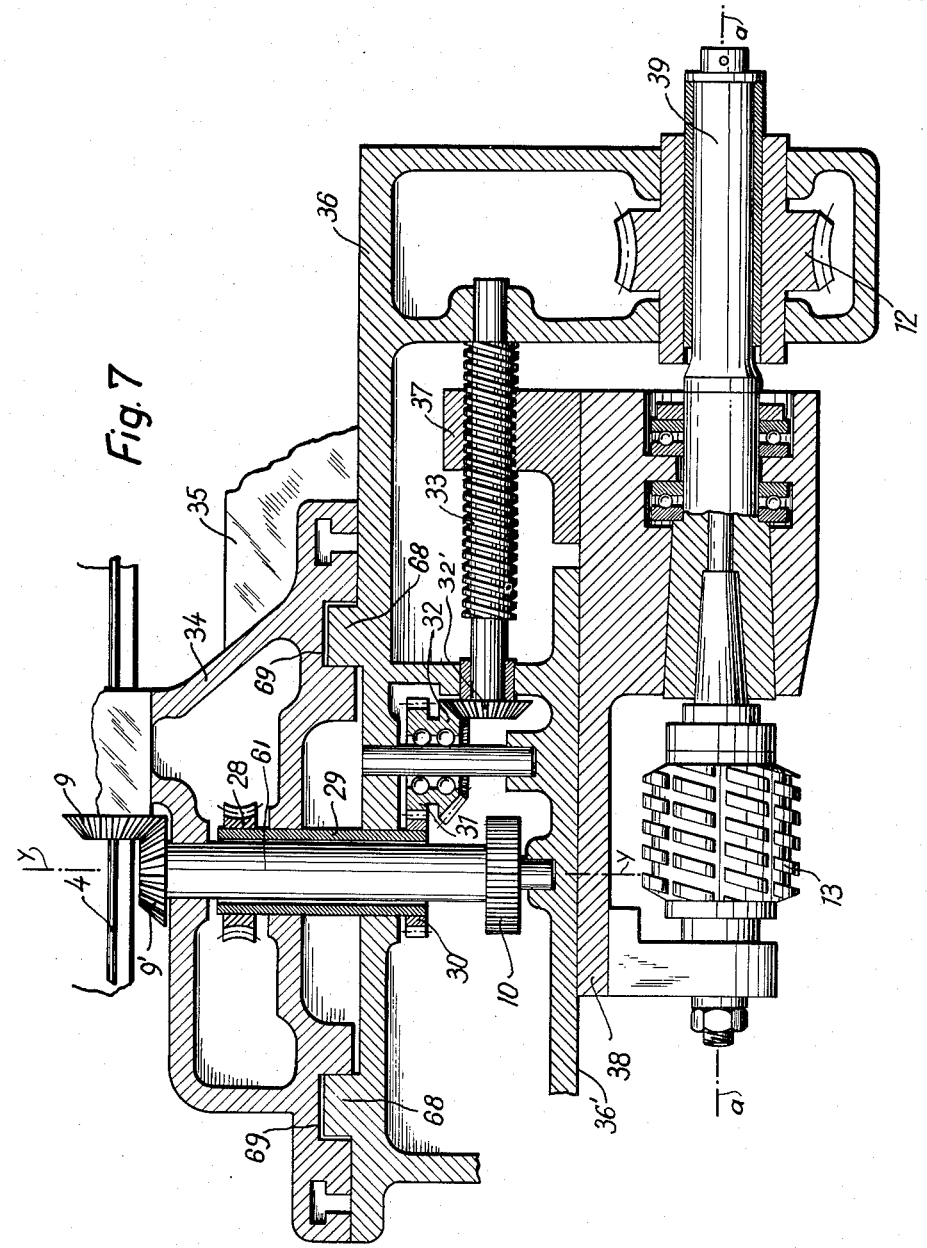
FIGURE 7 is an enlarged cross sectional view through the slide or carriage of the hob and through the hob head in accordance with the present invention.

The drive is transmitted from the vertical shaft 4 to a bevel gear 9 splined on shaft 4 so as to enable axial movement of bevel gear 9 on shaft 4 for reasons to be more fully explained hereinafter. The drive continues over the pair of bevel gears 9 and 9′, shaft 61 (FIGURES 5 and 7), spur gears 10, 10′, 10″ and 10‴ (FIGURE 5) and shaft 62 to worm 11 which is in meshing engagement with a worm gear 12 which in turn is drivingly connected with the hob spindle 39 in any suitable manner, for example, by a splined connection (FIGURE 7) which enables relative axial movement between gear 12 and spindle 39 for reasons to be more fully discussed hereinafter. The cutter or hob 13 is drivingly connected with the hob spindle 39, as shown in FIGURE 7. The parts 4, 9, 9', 61, 10, 12, 39 and 13 and the details of actual construction thereof in the gear hobbing machine are also shown more clearly in FIGURE 7.

*Feed of the cutter or hob*

Figure 6:
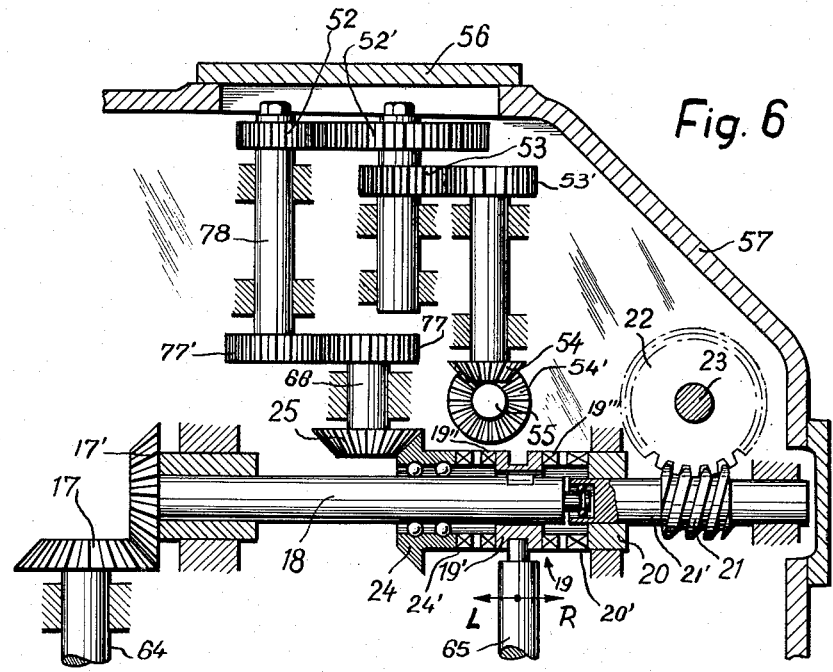
FIGURE 6 is a partial cross sectional view through the stand St showing on a larger scale a part of the drive arrangement of FIGURE 5 as carried out in the actual gear hobbing machine of FIGURE 4 in accordance with the present invention.

The worm 14 is mounted on shaft 6 for common rotation therewith and serves for branching off the drive from shaft 6 by means of worm gear 15 which is in meshing engagement with the worm 14 (FIGURE 5). The worm gear 15 drives a pair of meshing feed change gears 16 and 16' over shaft 63. The gear 16' is mounted on the lower end of shaft 64 which carries at its upper end a bevel gear 17 of a pair of meshing bevel gears 17 and 17' (FIGURES 5 and 6). The shaft 18 is rigidly connected with the bevel gear 17'. A clutch generally designated by reference numeral 19 is operatively connected with the shaft 18. The clutch may be of any suitable construction and is illustrated in FIGURE 6, for example, as a double claw clutch although any other type providing analogous operational characteristics would be suitable.

FIGURE 6 shows the details of the clutch 19 somewhat more clearly. The clutch 19 consists of a shifting sleeve 19' provided with an annular groove into which a shifting fork 65 engages. The shifting sleeve 19' is suitably splined to the shaft 18 so as to provide common rotation therewith while enabling axial movement relative to the shaft 18. The shifting sleeve 19' is provided with jaw clutch members 19" and 19'" which are disposed on opposite sides of the shifting sleeve 19'. The jaw clutch member 19" is adapted to be brought into engagement with a jaw clutch member 24' which may be secured to or formed integral with the bevel gear 24. Similarly the jaw clutch member 19'" is adapted to be brought into engagement with the jaw clutch member 20' of the coupling part 20 which is securely mounted on the shaft 21' which carries the worm 21.

If the shifting sleeve 19' of clutch 19 is shifted in the direction of the arrow R as shown in FIGURE 6 then only jaw clutch member 19'" is coupled to the jaw clutch member 20' of coupling part 20 whereby only the worm 21 and the worm gear 22 are driven by the shaft 18. The worm gear 22 is rigidly secured to the feed spindle 23 for the axial feed of the hob carriage 34 in the direction parallel to the axis of the workpiece gear 46 and of the gear 8.

If the shifting sleeve 19' of clutch 19 is shifted in the direction of the arrow L then the engagement of jaw clutch member 20' with coupling member 19'" is thereby released and the jaw clutch member 24' of bevel gear 24 is thereby engaged by jaw clutch member 19". The bevel gear 24, in the embodiment of FIGURE 5, drives bevel gear 25 mounted on shaft 66 to which is also secured change gear 26 on the pair of meshing change gears 26 and 26', the latter transmitting the drive to worm 27 over shaft 67 (FIGURE 5). The worm 27 drives the worm gear 28 which is drivingly connected with hollow shaft 29 concentric with shaft 61 (FIGURE 7) and thereby drives meshing gears 30 and 31, bevel gears 32 and 32' and therewith the externally threaded feed spindle 33 for the tangential feed movement of the cutter or hob 13 (FIGURES 5 and 7).

FIGURE 7 shows more clearly the details of the parts providing the tangential feed of the cutter or hob 13. The cutter or hob carriage 34 is movable within housing 35 of the stand St in a direction parallel to the vertical shaft 4 whereas the hob head 36 is swingably supported on the hob carriage 34 so as to be rotatable effectively about the axis y—y of the gears 10, 28 and 30 and of the hollow shaft 29. For that purpose, the hob head 36 is provided with guide means in the form of circular guide projection 68 or a plurality of circularly disposed guide projection portions which are guided in a circular guide channel 69 provided in hob carriage 34.

The spindle 33 is rotatably supported in the hob head 36 in any suitable manner and moves the slide member 38 along a suitably flat slide-backing surface of the hob head 36 in the direction of the axis of the hob or cutter 13 and of the hob spindle 39 by means of nut member 37 which is suitably secured to slide 38 and which engages the threaded portion of feed spindle 33. The hob spindle 39 is suitably secured to the worm gear 12, as for example, by a splined connection to provide common rotary movement of worm gear 12 and hob spindle 39 while enabling relative movement of spindle 39 relative to worm gear 12 in the axial direction of the spindle 39 so as to permit the "tangential" feed movement of nut member 37 and slide 38 and therewith of hob 13 and spindle 39 upon rotation of feed spindle 33.

The "tangential" feed of the cutter or hob 13 by means of spindle 33, i.e., its movement or feed in the direction of its own axis a—a, therefore, results in the feed or movement of hob 13 in a tangential direction with respect to the workpiece 46 (FIGURE 5).

*Feed of the workpiece*

The workpiece 46 which is mounted on the table T concentrically to the gear has to be rotated additionally an amount corresponding to such tangential feed of the hob 13, as pointed out above. This is achieved by means of the differential 47 (FIGURE 5).

The drive for the additional rotation of the workpiece 46 is branched off from the feed shaft 64 for the feed of the hob 13 by means of a gear 48 drivingly connected with shaft 64 which transmits the drive to member 70 of the differential 47 over the meshing gear 48', the pair of meshing change gears 49 and 49', shaft 75, worm 50 and worm gear 51. The member 70 of differential 47 is connected to spider gears 71 and 72 which mesh with gears 73 and 74 drivingly connected with shafts 2' and 76, respectively. It is understood, of course, that the gear ratios of the change gears 49 and 49' are chosen correspondingly, i.e., so as to produce the required additional feed of the work table T.

If the shifting sleeve 19' of clutch 19 is in the center position thereof as shown in FIGURES 5 and 6, then the jaw clutch member 20' as well as jaw clutch member 24' are both engaged. As a result thereof the feed spindle 23 and the feed spindle 33 are both driven simultaneously and the machine provides a gear hobbing operation having simultaneous axial and tangential movement or feed of the cutter or hob 13. As a result thereof, the operation is such that the contour cuts are as shown in FIGURE 2, i.e., the marks of the contour cuts do not extend parallel to the edges of the teeth, as shown in FIGURE 1 but instead diagonally over the face or pressure surface of the tooth. The size of the angle α determining the incline of this cut thereby depends on the ratio of the amount of axial displacement or feed to the tangential displacement or feed of the cutter or hob 13 with respect to the gear 8 and workpiece 46. In order to adjust this ratio and therewith the angle of diagonal movement to any value desired or used in connection with the machine change gears 26 are provided in FIGURE 5.

Figure 8:
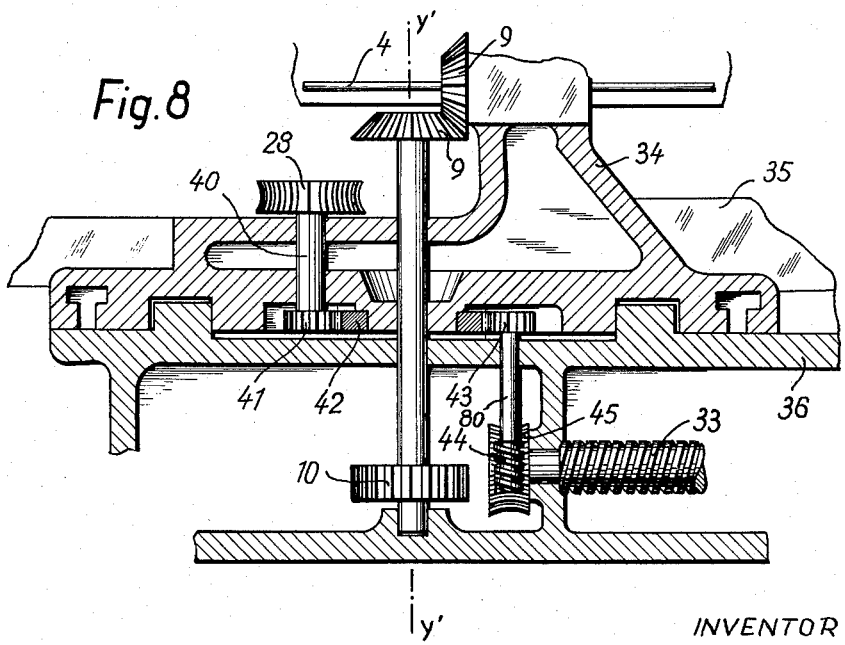
FIGURE 8 is an enlarged cross sectional view similar to FIGURE 7 through a modified embodiment of the hob carriage or slide in accordance with the present invention.

FIGURE 6 illustrates a modification of FIGURE 5 as regards the means of changing the angle α. Exchangeable gears 52 and 52' are provided in FIGURE 6 in the place of gears 26 and 26' of FIGURE 5. The gear 52 is driven by bevel gear 25 over change gears 77 and 77' and shaft 78 and transmit the drive over the change gears 53 and 53' which are provided for reversal of the direction of rotation of the bevel gears 54 and 54' to the shaft 55. The worm 27 (FIGURE 5) is mounted on shaft 55 for common rotation therewith and engages the worm gear 28 as shown in FIGURE 7 or 8. The lid 56 in the housing 57 of the bracket St is removable so that the change gears 52 and 53 are easily accessible for interchange if the angle α of the cut is to be changed.

FIGURE 8 illustrates a slightly modified embodiment similar to FIGURE 7 in which the hollow shaft 29 is obviated. The worm gear 28 is supported on a shaft 40 which is supported laterally of the pivoting axis y'—y' of the cutter or hob head 36 in the hob carriage 34. The drive is transmitted from shaft 40 over gears 41, 42 and 43, shaft 80 and worm 44, meshing with worm gear 45 to the feed spindle 33. Gear 42 is thereby supported concentrically to pivot the axis y'—y' on the cutter or hob carriage 34 whereas the wheel 43 is supported in the hob head 36. Instead of the worm gear drive 44 and 45, bevel gears, such as bevel gears 32 and 32' may also be used.

*Operation*

The operation of the gear hobbing machine in accordance with the present invention is as follows:

After the helically shaped hob 13 is positioned radially with respect to the workpiece 46 corresponding to the depth of the tooth, and with the shifting fork 65 in the center position thereof, as indicated in FIGURE 6 so as to drive both clutching members 24' and 20' by motor 1 over elements 2, 2', 47, 76, 5, 5', 14, 15, 63, 16, 16', 64, 17, 17', 18 and 19', the hob carriage 34 is advanced in the axial direction of the workpiece by means of the drive elements 20, 21, 22 and feed spindle 23. Simultaneously therewith, the slide 38 in which the hob 13 is mounted, is advanced in a direction tangentially to the workpiece 46 by means of the drive over drive elements 24, 25, 66, 26, 26', 67, 27, 28, 29, 30, 31, 32, 32' and 33 (FIGURE 5) or drive elements 24, 25, 66, 77, 77', 78, 52, 52', 53, 53', 54, 54' (FIGURE 6) and 27, 28, 29, 30, 31, 32, 32' and 33 (FIGURE 5). Preferably the ratio of axial advance or feed to the tangential advance or feed of the hob is so adjusted that the hob 13 is displaced in the tangential direction by an amount corresponding to the entire length of the hob if the hob carriage 34 is displaced over the width of the workpiece in the axial direction thereof.

In order to provide the additional rotation of the workpiece 46 the differential 47 is provided which adds the necessary rotary component to the rotation when the tangential feed of the hob takes place.

The normal drive of the workpiece 46 by means of elements 2', 73, 72, 71, 74, 76, 5, 5', 6, 7 and 8 is simultaneously coupled also with the drive of the spindle 39 of the hob 13, the spindle 39 being driven over elements 3, 3', 4, 9, 9', 61, 10, 10', 10'', 10''', 62, 11, and 12 so that the threads of the helically shaped cutter perform a hobbing operation along the periphery of the workpiece 46.

Thus, in addition to the advantage of even wear of the hob teeth and improved roll-off characteristics of the teeth, a further advantage of the operation according to the present invention resides in the fact that it is possible, without any further special equipment or particular skill, to manufacture a larger number of toothed gears which are all completely identical with respect to each other in that the position of a tooth gap remains always the same with respect to a certain point of the gear, for example, with respect to a spline groove in the hub thereof. This is because the hob 13 and the work table T are all driven positively through their various motions so that there will be a positively maintained given true relation between the hob teeth and the teeth formed in a particular workpiece, because, further, the hob 13 is driven through its axial travel and through its concurrent travel axially of the work piece once for each gear produced and is then to be returned to a start position for a repeat course or cycle of actions for cutting a next gear, and because, still further, as previously pointed out, the disclosed means for cutting gear teeth produces symmetrical teeth without the necessity for a manual adjustment, as by special feeler gauges, of a tooth or tooth gap of the hob to the center of the machine before a tooth cutting cycle begins relative to a workpiece. Thus in the present apparatus, the hob can be brought back to a definite start position for each successive blank to be cut and every part and tooth of the hob will go through a repeat cycle or course of actions from a starting point to a finishing point for cutting identical gears from identical blanks successively placed on table T. If each of these blanks has a spline groove in its hub and is mounted on the table T with its spline groove in a given index position, the relation of the teeth and the interdental spaces formed in the blank by the hob during its cycle of actions will be the same fixed positional relation to the spline groove for each of successive gears produced by the machine.

The gear hobbing method according to the present invention may also be realized, depending on the width of the workpiece, in such a manner that the cutter or hob during the axial movement thereof over the width of the workpiece is displaced in a continuous manner only over one-half or, with relatively thin workpieces, only over one-fourth of its entire length. It is always decisive that the edges of the contour cuts in the surfaces of two meshing teeth rolling off one another form such a large angle with respect to each other that an interlocking or hooking engagement of the edges of the contour cuts and therewith roll-off jumps are avoided with certainty.

It is also understood that the gear hobbing machines disclosed herein are provided with all the necessary control mechanisms and elements which are commonly formed in such types of machines as will produce the preliminary adjustment of the mechanism whereby the various parts may be brought to the operating position. Such arrangements also include the necessary elements which will produce the rapid return feed of the hob to the initial or original starting position. Since such devices including the electrical and/or hydraulic systems and control arrangements are well known in the prior art, it is believed that a specific showing and detailed description of the same may be dispensed with herein.

While I have shown several embodiments in accordance with the present invention, it is understood that the same is susceptible of many changes and modifications within the spirit of the present invention, and I intend to cover all such changes and modifications except as limited by the claims.

Moreover, the application of the method and apparatus according to my invention is not limited to the specific ones described hereinabove, but may be used in connection with other applications.

For example, the apparatus in accordance with the present invention may also be used if gear teeth are to be cut or hobbed which are crown-shaped, i.e., in which the thickness of the tooth in the axial direction of the gear gradually increases from a minimum at one side to a maximum in the center thereof and thereupon again gradually decreases from the maximum in the center to the minimum at the other side thereof. Such a tooth can be easily manufactured if the teeth of the cutter or hob are arranged in such a manner that the thickness of the teeth decreases evenly from both ends thereof toward the center thereof.

With increasing axial feed of the hob 13 the teeth having less and less thickness come into operation due to the simultaneous tangential feed of the hob so that teeth having an essentially crown shape as described above can be readily manufactured.

It is also unnecessary in connection with such crown shaped teeth that the tangential feed take place over the entire length of the hob but it is only necessary that the tangential feed be over a distance which is symmetrical with the center thereof.

After termination of each pass the carriage and head are brought back with a rapid traverse to the original position thereof.

I claim:
1. In a hobbing machine, a work carrier, a hob carrier, a main drive shaft, gear means connecting said main drive shaft and hob carrier for rotating the latter, a work carrier index shaft, means including change gears and a differential connecting said main and index shafts, a drive from said index shaft and including three branches, change gears in one branch and connecting said one branch to said differential for controlling the same, means actuated by a second of said branches for feeding said work carrier and hob carrier relatively to each other in a direction axially of said work carrier, and means including change gears in a third of said branches and connecting said third branch to means for feeding said hob carrier and work carrier relatively to each other in a direction tangentially of work on said work carrier.

2. In a hobbing machine, a rotary work carrier for a gear blank, a hob-carrying spindle in tangential relation to the gear blank, a slide journaling the spindle, means mounting the slide for displacement in the direction of the spindle axis and consequent axial displacement of the spindle and hob thereon, a motor-driven shaft, first and second drive shafts collaterally driven from the motor-driven shaft, gearing between the first drive shaft and the hob-carrying spindle for continuously rotating the spindle at a suitable speed, gearing actuated from the second drive shaft for rotating the work carrier, and other gearing actuated from the second drive shaft and including concurrently functioning first and second gear sets, a first set for displacing said slide in the direction of the hob spindle to effect tangential feed of the hob relative to the gear blank during gear cutting, the second set for concurrently but separately actuating the slide and the work carrier relatively to each other in a direction axial of the work carrier thereby to effect operative feed of the hob over the width of the gear blank during gear cutting, and change gears in at least one of said sets for enabling the tangential feed of the hob to be selectively directly proportioned to the feed of the hob over the width of the gear blank, whereby the extent of tangential feed can be varied according to the width of the teeth to be cut in the blank.

3. In a hobbing machine, a work carrier, a hob carrier, a main drive shaft, a work carrier index shaft geared to and driven from said main drive shaft, a gear connection from said main drive shaft to said hob carrier for rotating the latter, a drive from said work carrier index shaft including two branches, one of said branches being connected to means for moving said hob carrier and said work carrier relative to each other in a direction axial of said work carrier, the other of said branches being connected to means for relatively moving said hob carrier and the work piece tangentially of the latter, said two branches being operated simultaneously for separately producing the aforesaid relative movement of said hob carrier and work carrier, and change speed gears in one of said branches for varying the ratio between the feed of said work carrier and hob carrier in a direction axial of the work carrier and the feed of said hob carrier and work carrier in a direction tangential of the work carrier.

References Cited in the file of this patent

UNITED STATES PATENTS

| | | |
|---|---|---|
| 640,728 | Pfauter | Jan. 2, 1900 |
| 1,140,610 | Reinecker | May 25, 1915 |
| 2,152,469 | Edgar | Mar. 28, 1939 |
| 2,374,254 | Zimmermann | Apr. 24, 1945 |
| 2,537,967 | Carlin | Jan. 16, 1951 |
| 2,563,982 | Warner | Aug. 14, 1951 |
| 2,684,016 | Staples | July 20, 1954 |
| 2,837,010 | Davenport | June 3, 1958 |
| 2,839,968 | Moncrieff | June 24, 1958 |
| 2,857,818 | Zimmermann et al. | Oct. 28, 1958 |
| 2,891,450 | Freudiger | June 23, 1959 |

FOREIGN PATENTS

| | | |
|---|---|---|
| 309,870 | Great Britain | May 22, 1930 |